US012631998B2

(12) United States Patent
Uno et al.

(10) Patent No.: US 12,631,998 B2
(45) Date of Patent: May 19, 2026

(54) IMAGE FORMING APPARATUS

(71) Applicant: KYOCERA Document Solutions Inc., Osaka (JP)

(72) Inventors: Koji Uno, Osaka (JP); Keisuke Oba, Osaka (JP); Kazuaki Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/048,459

(22) Filed: Feb. 7, 2025

(65) Prior Publication Data

US 2025/0264837 A1 Aug. 21, 2025

(30) Foreign Application Priority Data

Feb. 19, 2024 (JP) ................................ 2024-023121

(51) Int. Cl.
*G03G 15/00* (2006.01)

(52) U.S. Cl.
CPC ..... *G03G 15/5037* (2013.01); *G03G 15/5041* (2013.01); *G03G 2215/00037* (2013.01)

(58) Field of Classification Search
CPC ........... G03G 15/1675; G03G 15/5037; G03G 15/5041; G03G 2215/00037
See application file for complete search history.

(56) References Cited

U.S. PATENT DOCUMENTS

2006/0188276 A1 8/2006 Nishida et al. ................. 399/49
2007/0248369 A1* 10/2007 Izumi ................ G03G 15/1675 399/45
2008/0038006 A1* 2/2008 Imagawa ........... G03G 15/1675 399/49
2011/0311253 A1* 12/2011 Takada .............. G03G 15/2028 399/45

FOREIGN PATENT DOCUMENTS

JP H 10-198194 A 7/1998
JP 2002-156846 A 5/2002
JP 2006-235023 A 9/2006

* cited by examiner

*Primary Examiner* — Hoang X Ngo
(74) *Attorney, Agent, or Firm* — Stein IP, LLC

(57) ABSTRACT

A control portion can perform printing operation and to determine a transfer voltage for performing it, transfer voltage setting operation. When performing adjusting operation, the control portion estimates the amount of static charge of toner in a development device to determine the transfer voltage based on the estimated amount of static charge of the toner and the resistance value of a transferring member previously stored in a memory.

6 Claims, 4 Drawing Sheets

IMAGE FORMING APPARATUS

INCORPORATION BY REFERENCE

This application is based on and claims the benefit of priority from Japanese Patent Application No. 2024-023121 filed on Feb. 19, 2024, the contents of which are hereby incorporated by reference.

BACKGROUND

The present disclosure relates to an image forming apparatus.

Conventional image forming apparatuses include an image forming portion, a transferring member, a development voltage power supply, a charging voltage power supply, a transfer voltage power supply, a control portion, and a memory. The image forming portion includes an image carrying member, a charging device, an exposure device, and a development device. The image carrying member has a photosensitive layer formed on its surface. The development voltage power supply applies a development voltage to a developer carrying member. The charging device has a charging member that electrostatically charges the image carrying member. The exposure device exposes to light the image carrying member electrostatically charged by the charging device to form an electrostatic latent image. The development device has a developer carrying member that is disposed opposite the image carrying member and that carries developer to attach toner to the electrostatic latent image formed on the image carrying member to form a toner image. The transferring member is disposed opposite the image carrying member and, with a predetermined transfer voltage applied to it, transfers the toner image formed on the image carrying member to a transfer destination member.

The development voltage power supply applies a development voltage to the developer carrying member. The charging voltage power supply applies a charging voltage to the charging member. The transfer voltage power supply applies a transfer voltage to the transferring member. The control portion controls the image forming portion, the development voltage power supply, the charging voltage power supply, and the transfer voltage power supply.

In the conventional image forming apparatus, the control portion forms a plurality of toner images (reference image) with the same density on the image carrying member to transfer the toner images to the transfer destination member with different transfer voltages. For example, the image forming apparatus measures the transfer efficiency of the toner images transferred to the transfer destination member to determine, based on the transfer efficiency, an optimal transfer voltage in printing operation. For another example, the image forming apparatus measures the image density of the toner images transferred to the transfer destination member to determine, based on the image density, an optimal transfer voltage in printing operation.

The conventional image forming apparatus is also provided with image stabilizing control (calibration) for keeping the image density of the toner image on the transfer destination member constant to determine, based on the image density obtained through the image stability control, an optimal transfer voltage in printing operation.

Thus, even if the resistance value of the transferring member varies, it is possible to determine an optimal transfer voltage and to prevent transfer failure.

With the conventional technologies, the operation time required to determine the transfer voltage tends to be long.

In view of the above inconvenience, an object of the present disclosure is to provide an image forming apparatus that can prevent transfer failure while reducing operation time.

SUMMARY

According to one aspect of the present disclosure, an image forming apparatus includes an image forming portion, a transferring member, a development voltage power supply, a charging voltage power supply, a transfer voltage power supply, a control portion, and a memory. The image forming portion includes an image carrying member, a charging device, an exposure device, and a development device. The image carrying member has a photosensitive layer formed on its surface. The charging device has a charging member that electrostatically charges the image carrying member. The exposure device exposes to light the image carrying member electrostatically charged by the charging device to form an electrostatic latent image. The development device is disposed opposite the image carrying member and has a developer carrying member that carries developer. The development device attaches toner to the electrostatic latent image formed on the image carrying member to form a toner image. The transferring member is disposed opposite the image carrying member. The transferring member transfers, with a predetermined transfer voltage applied to it, the toner image formed on the image carrying member to a transfer destination member. The development voltage power supply applies to the developer carrying member a development voltage having an alternating-current voltage superposed on a direct-current voltage. The charging voltage power supply applies a charging voltage to the charging member. The transfer voltage power supply applies the transfer voltage to the transferring member. The control portion controls the image forming portion, the development voltage power supply, the charging voltage power supply, and the transfer voltage power supply. The memory stores the resistance value of the transferring member. The control portion can perform printing operation and can also perform transfer voltage setting operation to determine the transfer voltage for performing the printing operation. When performing adjusting operation, the control portion estimates the amount of static charge of the toner in the development device to determine the transfer voltage based on the estimated amount of static charge of the toner and the resistance value of the transferring member previously stored in the memory.

Other objects of the present disclosure and specific advantages it offers will become clearer through the following description of an embodiment.

DETAILED DESCRIPTION

Figure 1:
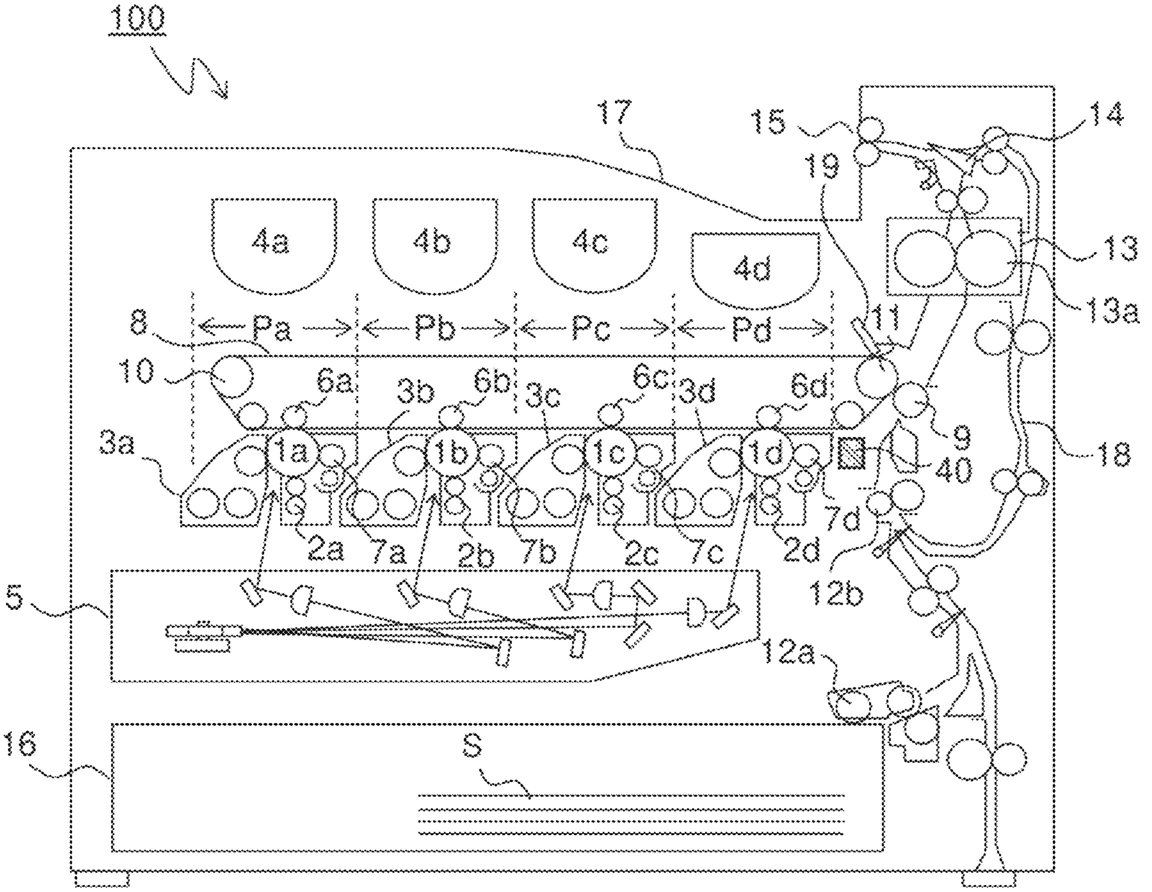
FIG. 1 is a side sectional view showing the internal construction of an image forming apparatus 100 according to a first embodiment of the present disclosure.
Figure 2:
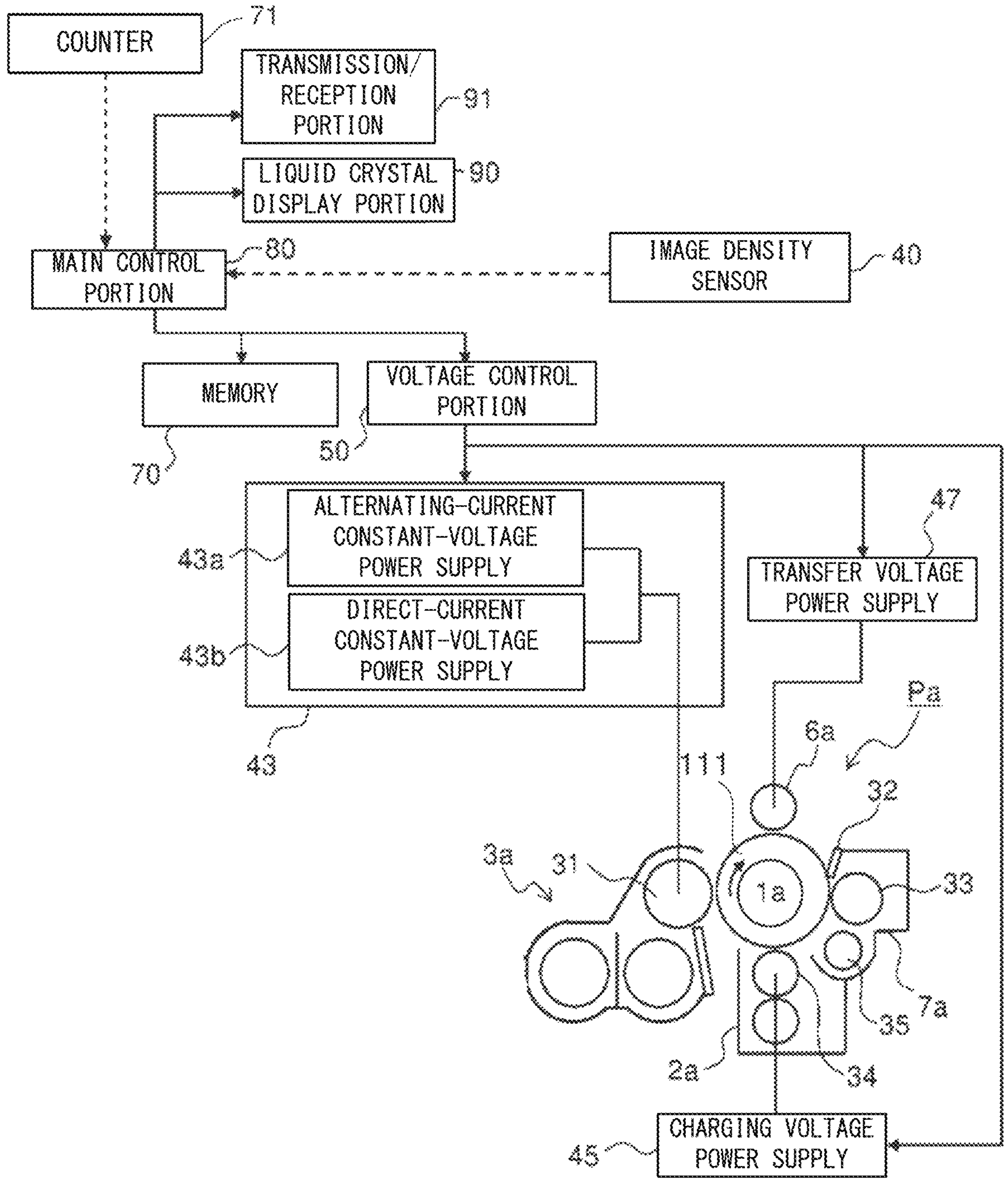
FIG. 2 is an enlarged part view around an image forming portion Pa together with control paths in the image forming apparatus 100 according to the first embodiment of the present disclosure.

FIRST EMBODIMENT: Now, a first embodiment of the present disclosure will be described with reference to the drawings. FIG. 1 is a sectional view showing the internal construction of an image forming apparatus 100 according to the first embodiment of the present disclosure. FIG. 2 is an enlarged part view around an image forming portion Pa together with control paths in the image forming apparatus 100. Note that no description will be given of the configuration of the image forming portions Pb to Pd or the control paths for the charging devices 2*b* to 2*d* because they are similar to that of the image forming portion Pa and those for the charging device 2*a*.

The image forming apparatus 100 includes image forming portions Pa to Pd, primary transfer rollers (transferring members) 6*a* to 6*d*, a development voltage power supply 43, a charging voltage power supply 45, a transfer voltage power supply 47, a main control portion (a control portion) 80, a memory 70, and a counter 71.

In the body of the image forming apparatus 100 (here, a color printer), the four image forming portions Pa, Pb, Pc, and Pd are arranged in this order from upstream (left in FIG. 1) in the conveyance direction. The image forming portions Pa to Pd are disposed so as to correspond to images of four different colors (cyan, magenta, yellow, and black), and, through the processes of electrostatic charging, exposure to light, image development, and image transfer, sequentially forms a cyan, a magenta, a yellow, and a black image.

The image forming portions Pa to Pd include the primary transfer rollers (transferring members) 6*a* to 6*d*, photosensitive drums (image carrying members) la to 1*d* that carry visible images (toner images) of the different colors, charging devices 2*a* to 2*d*, an exposure device 5, and development devices 3*a* to 3*d*. Adjacent to the image forming portions Pa to Pd, an intermediate transfer belt (transfer destination member) 8 is provided that rotates, by being driven by a driving member (not shown), counterclockwise in FIG. 1.

The primary transfer rollers (transferring members) 6*a* to 6*d* are disposed opposite the photosensitive drums (image carrying members) 1*a* to 1*d* and, with the application of a predetermined transfer voltage, transfer, to the intermediate transfer belt (transfer destination member) 8, the visible images (toner images) of different colors formed on the photosensitive drums (image carrying members) 1*a* to 1*d*. The toner images formed on the photosensitive drums 1*a* to 1*d* are then primarily transferred sequentially to the intermediate transfer belt 8 moving while in contact with the photosensitive drums 1*a* to 1*d* so as to be superposed on each other.

The toner images primarily transferred to the intermediate transfer belt 8 are secondarily transferred by a secondary transfer roller 9 to a sheet S as one example of a recording medium. The sheet S to which the toner images are to be secondarily transferred is stored in a sheet cassette 16 disposed in a lower part of the body of the image forming apparatus 100. The sheet S is conveyed via a sheet feeding roller 12*a* and a pair of registration rollers 12*b* to a nip portion between the secondary transfer roller 9 and a driving roller 11 for the intermediate transfer belt 8.

The intermediate transfer belt 8 can be implemented with a sheet of a dielectric resin, typically with a belt without a seam (a seamless belt). In addition, downstream of the secondary transfer roller 9, a belt cleaner 19 having the shape of a blade is disposed for removing toner and the like left on the surface of the intermediate transfer belt 8.

The photosensitive drums (image carrying members) 1*a* to 1*d* have a photosensitive layer 111 on their surfaces (see FIG. 2). In the embodiment, the photosensitive drums (image carrying members) 1*a* to 1*d* are cylinders aluminum with a photosensitive layer 111 formed on their surfaces. The photosensitive layer 111 is formed through deposition of amorphous silicon, which is positively chargeable photoconductor.

The charging devices 2*a* to 2*d* have charging rollers (charging members) 34. The charging rollers 34 are disposed opposite the photosensitive drums (image carrying members) 1*a* to 1*d*, and electrostatically charge the photosensitive drums (image carrying members) 1*a* to 1*d*. The charging rollers 34 are, for example, formed by coating a metal base with a layer of epichlorohydrin rubber, which is an electrically conductive, elastic material. In the embodiment, the charging rollers 34 contact the photosensitive drums 1*a* to 1*d* respectively. Note that the charging rollers 34 can be configured not to contact the photosensitive drums 1*a* to 1*d*.

The exposure device 5 exposes to light the photosensitive drums (image carrying members) 1*a* to 1*d* electrostatically charged by the charging devices 2*a* to 2*d* to form electrostatic latent images.

The development devices 3*a* to 3*d* are disposed opposite the photosensitive drums (image carrying members) 1*a* to 1*d* and include a developing roller (developer carrying member) 31. The development devices 3*a* to 3*d* apply a predetermined development voltage to the developing roller (developer carrying member) 31 to attach toner to the electrostatic latent images formed on the photosensitive drums (image carrying members) 1*a* to 1*d* so as to form toner images. The developing roller (developer carrying member) 31 is disposed opposite the photosensitive drums (image carrying members) 1*a* to 1*d*, and carries two-component developer containing magnetic carrier and toner.

When image data is fed in from a host device such as a personal computer, first the charging devices 2*a* to 2*d* electrostatically charge the surfaces of the photosensitive drums 1*a* to 1*d* evenly. Then the exposure device 5 shines light based on the image data to form, on the photosensitive drums 1*a* to 1*d*, electrostatic latent images based on the image data.

The development devices 3*a* to 3*d* are loaded with a predetermined amount of two-component developer containing toner of different colors, namely cyan, magenta, yellow, and black respectively. The development devices 3*a* to 3*d* supply and electrostatically attach the toner in the developer to the photosensitive drums 1*a* to 1*d* to form toner images based on the electrostatic latent images formed by exposure to light from the exposure device 5.

The primary transfer rollers 6*a* to 6*d* produce a magnetic field, with a predetermined transfer voltage, between the primary transfer rollers 6*a* to 6*d* and the photosensitive drums 1*a* to 1*d* so as to primarily transfer the toner images of cyan, magenta, yellow, and black on the photosensitive drums 1*a* to 1*d* to the intermediate transfer belt 8. These images of four colors are formed with a predetermined positional relationship that is determined beforehand for the formation of a predetermined full-color image. After primary transfer, the toner and the like left on the surface of the photosensitive drums 1*a* to 1*d* are removed by the cleaning devices 7*a* to 7*d* in preparation for the subsequent formation of new electrostatic latent images.

The intermediate transfer belt 8 is wound around a driven roller 10, disposed upstream, and a driving roller 11, disposed downstream. When a drive motor (not shown) rotates the driving roller 11 and as a result the intermediate transfer belt 8 starts to rotate counterclockwise, a sheet S is conveyed with predetermined timing from the pair of registration rollers 12*b* to the nip portion (secondary transfer nip portion) between the driving roller 11 and the secondary transfer roller 9, which are disposed adjacent to each other; thus, the full-color image on the intermediate transfer belt 8 is secondarily transferred to the sheet S. The sheet S having the toner image secondarily transferred to it is conveyed to a fixing portion 13.

The sheet S conveyed to the fixing portion 13 is heated and pressed by a pair of fixing rollers 13*a* so that the toner image is fixed to the surface of the sheet S, thereby forming the predetermined full-color image. The sheet S having the full-color image formed on it has its conveyance direction switched by a branching portion 14 branching into a plurality of directions, and is then ejected, as it is (or after being sent to a duplex conveyance passage 18 to have images formed on both sides), to an ejection tray 17 by a pair of ejection rollers 15.

At a position opposite the driving roller 11 across the intermediate transfer belt 8, an image density sensor 40 is disposed. The image density sensor 40 measures the density of the toner image transferred (the amount of toner attached) to the intermediate transfer belt 8.

The development voltage power supply 43 is connected to the developing roller 31 (see FIG. 2). The development voltage power supply 43 includes an alternating-current constant-voltage power supply 43*a* and a direct-current constant-voltage power supply 43*b*. The alternating-current constant-voltage power supply 43*a* outputs an alternating-current voltage with a sine wave generated from a low direct-current voltage that is pulse-modulated using a step-up transformer (not shown). The direct-current constant-voltage power supply 43*b* outputs a direct-current voltage obtained by rectifying an alternating-current voltage with a sine wave generated from a low direct-current voltage that is pulse-modulated using a step-up transformer.

The development voltage power supply 43 applies to the developing roller 31 a development voltage having an alternating-current voltage from the alternating-current constant-voltage power supply 43*a* superposed on a direct-current voltage from the direct-current constant-voltage power supply 43*b*. Applying to the developing roller 31 a development voltage having an alternating-current voltage superposed on a direct-current voltage makes it easy to control the developing properties of toner during image formation, leading to improved image quality. Moreover, by adjusting the development voltage based on the density of the toner image sensed by the image density sensor 40, it is possible to stabilize the density of the toner image transferred to the intermediate transfer belt 8.

The charging voltage power supply 45 is connected to a charging roller 34 (see FIG. 2). In the embodiment, the charging voltage power supply 45 applies a charging voltage containing only a direct-current voltage to the charging roller (charging member) 34 during image formation. Using only a direct-current voltage as the charging voltage helps reduce the wear of the photosensitive layer 111.

The transfer voltage power supply 47 applies a primary transfer voltage (transfer voltage) and a secondary transfer voltage to the primary transfer rollers 6*a* to 6*d* and the secondary transfer roller 9 (see FIG. 1) respectively. Note that the transfer voltage power supply 47 can be a power supply of, instead of a constant-voltage control type, a constant-current control type.

The cleaning device 7*a* includes a cleaning blade 32 for removing residual toner on the surface of the photosensitive drum 1*a*; a rubbing roller 33 for rubbing and polishing the surface of the photosensitive drum 1*a* while removing residual toner on the surface of the photosensitive drum 1*a*; and a conveyance spiral 35 for discharging the residual toner removed from the photosensitive drum 1*a* by the cleaning blade 32 and the rubbing roller 33 out of the cleaning device 7*a*.

The main control portion (control portion) 80 is configured with a CPU and the like. The main control portion 80 is connected to a memory 70 composed of a ROM and a RAM, and a counter (printed sheet number counter) 71. The main control portion 80 controls different portions of the image forming apparatus 100 (the charging devices 2*a* to 2*d*, the development devices 3*a* to 3*d*, the exposure device 5, the primary transfer rollers 6*a* to 6*d*, the cleaning devices 7*a* to 7*d*, the secondary transfer roller 9, the fixing portion 13, the development voltage power supply 43, the charging voltage power supply 45, the transfer voltage power supply 47, a voltage control portion 50, and the like) based on programs and data for control stored in the memory 70. The counter (printed sheet number counter) 71 counts the number of sheets printed on a cumulative basis.

The voltage control portion 50 controls: the development voltage power supply 43 applying the development voltage to the developing roller 31; the charging voltage power supply 45 applying the charging voltage to the charging roller 34; and the transfer voltage power supply 47 applying the transfer voltage to the primary transfer rollers 6*a* to 6*d* and the secondary transfer roller 9. Note that the voltage control portion 50 can be configured with a control program stored in the memory 70.

To the main control portion 80, a liquid crystal display portion 90 and a transmission/reception portion 91 are connected. The liquid crystal display portion 90 functions as a touch panel on which a user can make various settings for the image forming apparatus 100, and displays the condition of the image forming apparatus 100, the status of image formation, and the number of sheets printed. The transmission/reception portion 91 communicates with external devices across a telephone or Internet network.

As mentioned above, the resistance values of the primary transfer rollers 6*a* to 6*d* contain variations associated with manufacturing. Thus, if the resistance value of a primary transfer roller 6*a* to 6*d* is lower than a reference value taken as a reference, to prevent transfer failure, a higher primary transfer current (transfer current) has to be passed across that primary transfer roller 6*a* to 6*d*. This requires the primary transfer voltage (transfer voltage) applied from the transfer voltage power supply 47 to be set higher than the reference value.

On the other hand, it is preferable that the primary transfer current that is passed across the primary transfer rollers 6*a* to 6*d* be the minimum necessary. If a primary transfer current more than necessary flows in the primary transfer rollers 6*a* to 6*d*, the amount of static charge of the toner of the toner image transferred to the intermediate transfer belt 8 increases, during passage through a primary transfer nip portion, under the electric discharge occurring between the photosensitive drums 1*a* to 1*d* and the intermediate transfer belt 8. This may lead to secondary transfer failure, resulting in lower image quality. Moreover, if the primary transfer rollers 6*a* to 6*d* are made of an ion conductive material, the higher the primary transfer current, the more the resistance value of the primary transfer rollers 6*a* to 6*d* can become over time.

In the embodiment, the main control portion (control portion) 80 can perform printing operation and transfer voltage setting operation. In the transfer voltage setting operation, the primary transfer voltage (transfer voltage) for performing the printing operation is determined. When performing the transfer voltage setting operation, the main control portion (control portion) 80 estimates the amount of static charge of the toner in the development devices 3*a* to 3*d* to determine a primary transfer voltage based on the estimated amount of static charge of the toner and the resistance value of the primary transfer rollers (transferring member) 6*a* to 6*d* previously stored in the memory 70.

Specifically, the memory 70 has previously stored on it a table showing the relationship of the resistance value of the primary transfer rollers (transferring member) 6*a* to 6*d*, the amount of static charge of the toner in the development devices 3*a* to 3*d*, and an optimal transfer voltage so that, based on the resistance value of the primary transfer rollers (transferring member) 6*a* to 6*d* stored in the memory 70 and the estimated amount of static charge of the toner, the primary transfer voltage is determined. Thus, through transfer voltage setting operation, simply estimating the amount of static charge of the toner in the development devices 3*a* to 3*d* allows easy determination of an optimal primary transfer voltage. It is thus possible to pass an optimal transfer current across the primary transfer rollers 6*a* to 6*d*, thereby preventing transfer failure, and to reduce the duration of time of the transfer voltage setting operation.

In the embodiment, the amount of static charge of the toner in the development devices 3*a* to 3*d* is estimated by the following method. The main control portion (control portion) 80 forms a plurality of reference images (toner images) by applying a development voltage containing alternating-current components with different frequencies, and transfers them to the intermediate transfer belt (transfer destination member) 8 by applying the same transfer voltage. Then, the main control portion 80 senses density of the transferred reference images (toner images) with the image density sensor 40 and, based on the change of the density of the reference images (toner images), estimates the amount of static charge of the toner.

Specifically, while the frequency of the development alternating-current voltage is changed (e.g., between 3 kHz and 10 kHz), the reference images (toner images) are developed, and the density of the developed reference images (toner images) is measured by the image density sensor 40. Then, based on the density of the reference images (toner images), the amount of static charge of the toner is estimated. If as the frequency increases the density (the level of development) decreases, the amount of static charge of the toner is estimated to be high. If as the frequency decreases the density (the level of development) increases, the amount of static charge of the toner is estimated to be low. There is a correlation between the developing current and the density of the reference image (toner image), and thus, based on the relationship between the developing current and the density of the reference image, the amount of the static charge of the toner can be estimated.

With respect to the resistance value of the primary transfer rollers (transferring member) 6*a* to 6*d*, the memory 70 has previously stored on it a table showing the relationship among the amount of static charge of the toner, the transfer properties of the toner image (the minimum transfer current It0 at which the transfer efficiency is maximum), and the resistance value of the primary transfer rollers (transferring member) 6*a* to 6*d*, and based on the estimated amount of static charge of the toner and the transfer properties of the toner image, the resistance value of the primary transfer rollers (transferring member) 6*a* to 6*d* is determined. The determined resistance value of the primary transfer rollers (transferring member) 6*a* to 6*d* is stored in the memory 70. In this way, even if the resistance value of the primary transfer rollers 6*a* to 6*d* contains variations associated with manufacturing, an accurate resistance value can be obtained.

Figure 3:
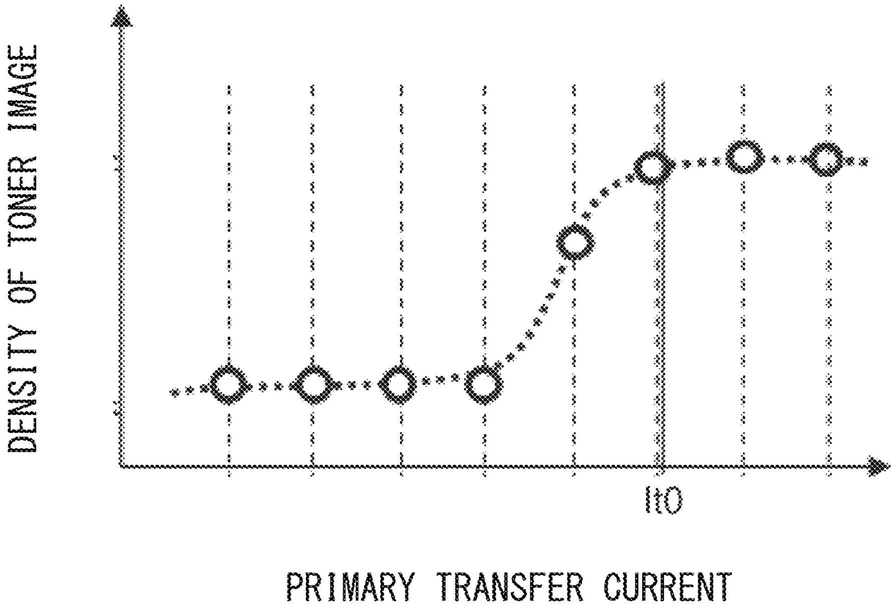
FIG. 3 is a graph showing the relationship between a primary transfer current and the density of a toner image in the image forming apparatus 100 according to the first embodiment of the present disclosure.

FIG. 3 is a graph showing the relationship between the primary transfer current and the density of the toner image. As shown in the figure, as the primary transfer current is set to be larger, the density of the toner image measured by the image density sensor 40 is higher. A higher density of the toner image is judged to indicate an improvement in the transfer properties in primary transfer. The transfer properties of the toner image settle beyond the primary transfer current of It0. Thus, based on this relationship between the primary transfer current and the density of the toner image, the minimum transfer current It0 at which the transfer efficiency is maximum can be estimated.

While, in the embodiment, the resistance value of the primary transfer rollers (transferring member) 6*a* to 6*d* is determined by the method described above based on the estimated amount of static charge of the toner and the minimum transfer current It0, the following configuration is also possible: if a transfer unit including the intermediate transfer belt (transfer destination member) 8 and the primary transfer rollers (transferring member) 6*a* to 6*d* is removably mounted in the image forming portion: the resistance value of the primary transfer rollers (transferring member) 6*a* to 6*d* is previously stored in the transfer unit so that, when the transfer unit is exchanged, it is stored in the memory 70. This helps eliminate the operation for determining the resistance value of the primary transfer rollers 6*a* to 6*d*.

The amount of static charge of the toner in the development devices 3*a* to 3*d* varies as the toner degrades with increasing number of sheets printed. Thus, in the embodiment, the main control portion (control portion) 80 performs, after performing the transfer voltage setting operation, the transfer voltage setting operation again when the cumulative number of sheets printed as counted by the counter (printed sheet number counter) 71 reaches a predetermined value (e.g., 1000 sheets). In this way, an optimal transfer voltage can be adjusted to suit the varying amount of static charge of the toner. In addition, if the resistance value of the primary transfer rollers (transferring member) 6*a* to 6*d* is estimated at an initial stage, in the transfer voltage setting operation at a later stage, simply estimating the amount of static charge of the toner allows easy determination of an optimal primary transfer voltage.

The main control portion (control portion) 80 performs, after performing the transfer voltage setting operation, the transfer voltage setting operation again also when the cumulative number of sheets printed as counted by the counter (printed sheet number counter) 71 reaches a predetermined value (e.g., 1000 sheets). In this way, if, at an initial stage, the resistance value of the primary transfer rollers (transferring member) 6*a* to 6*d* is estimated, in the transfer voltage setting operation at a later stage, simply estimating the amount of static charge of the toner allows easy determination of an optimal primary transfer voltage.

Figure 4:
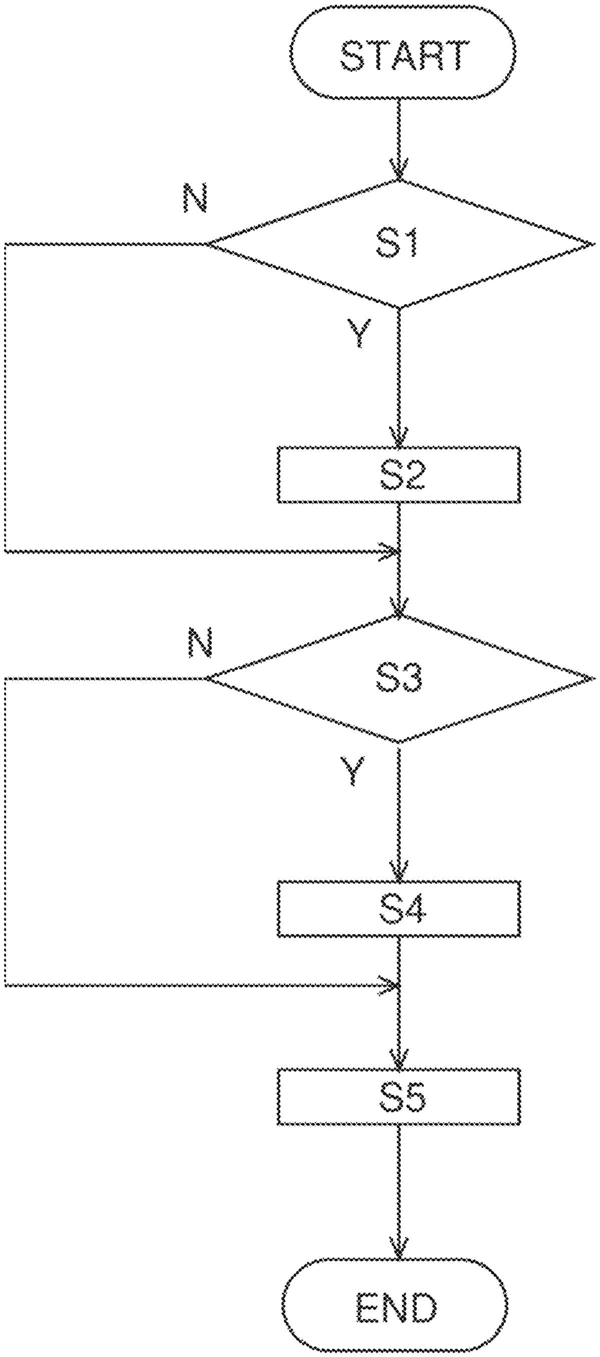
FIG. 4 is a flow chart showing an example of control on the image forming apparatus 100 according to the first embodiment of the present disclosure.

FIG. 4 is a flow chart showing an example of control on the image forming apparatus 100. On accepting a job involving the printing operation, the control portion 80 proceeds to Step S1. In Step S1, the control portion 80 checks whether it is a timing to determine the resistance value of the primary transfer rollers (transferring member) 6*a* to 6*d*. A timing to determine the resistance value can be, for example, when the image forming apparatus 100 is in an initial state after shipment and the printing operation is performed for the first time. If the control portion 80 judges that it is a timing to determine the resistance value of the primary transfer rollers (transferring member) 6*a* to 6*d*, it proceeds to Step S2. On the other hand, if the control portion 80 judges that it is not a timing to determine the resistance value of the primary transfer rollers (transferring member) 6*a* to 6*d*, it proceeds to Step S3.

In Step S2, the resistance value of the primary transfer rollers (transferring member) 6*a* to 6*d* is estimated. Specifically, the amount of static charge of the toner in the development devices 3*a* to 3*d* and the transfer properties (the minimum transfer current It0 at which the transfer efficiency is maximum) are estimated and, based on the table previously stored in the memory 70, the resistance value of the primary transfer rollers (transferring member) 6*a* to 6*d* is determined. For the amount of static charge of the toner in the development devices 3*a* to 3*d* and the transfer properties (the minimum transfer current It0 at which the transfer efficiency is maximum), the above-described method can be used. The decided resistance value of the primary transfer rollers (transferring member) 6*a* to 6*d* is stored in the memory 70.

In Step S3, whether it is a timing to determine the transfer voltage is checked. A timing to determine the transfer voltage can be, for example, when the transfer voltage is not yet set or when the cumulative number of printed sheets counted since the previous determination of the transfer voltage reaches a predetermined value (e.g., 1000 sheets). If it is a timing to determine the transfer voltage, the control portion 80 proceeds to Step S4. If it is not a timing to determine the transfer voltage, the control portion 80 proceeds to Step S5.

In Step S4, the transfer voltage setting operation is performed to determine the transfer voltage to be applied to the primary transfer rollers (transferring member) 6*a* to 6*d*. Specifically, the amount of static charge of the toner in the development devices 3*a* to 3*d* is estimated by the estimation method described above. In addition, based on the resistance value of the primary transfer rollers (transferring member) 6*a* to 6*d* stored in the memory 70 in Step S2 and the estimated amount of static charge of the toner, with reference to the table previously stored in the memory 70, the transfer voltage is determined. The determined transfer voltage is stored in the memory 70. In Step S5, using the transfer voltage stored in the memory 70, regular printing operation is performed.

While an embodiment of the present disclosure is described above, it is not meant to limit the scope of the present disclosure, which can thus be implemented with various modifications made without departing from the spirit of the present disclosure. For example, similar effects can be obtained by estimating the amount of static charge of the toner in the development devices 3*a* to 3*d* by any method different from the one described above.

For example, in one possible configuration, when performing the transfer voltage setting operation, the main control portion (control portion) 80 can form a plurality of reference images while applying, as a development voltage having an alternating-current voltage superposed on a direct-current voltage, different development voltages containing different direct-current components and transfer them to the intermediate transfer belt (transfer destination member) 8 with the same transfer voltage. The density of the transferred reference images (toner images) is sensed by the image density sensor 40, and based on the value of the direct-current component of the development voltage that makes the density of the reference images (toner images) equal to a predetermined reference value, the amount of static charge of the toner can be estimated.

While the embodiment described above, which makes an estimation by the method described above, deals with a color printer as shown in FIG. 1 as the image forming apparatus 100, it can be, instead of a color printer, any other image forming apparatuses such as a monochrome and color copier, a digital multifunction peripherals, or a facsimile.

The present disclosure finds applications in image forming apparatuses that include a charging roller.

What is claimed is:

1. An image forming apparatus comprising:
- an image forming portion including
  - an image carrying member having a photosensitive layer formed on a surface thereof,
  - a charging device having a charging member that electrostatically charges the image carrying member,
  - an exposure device that exposes to light the image carrying member electrostatically charged by the charging device to form an electrostatic latent image, and
  - a development device disposed opposite the image carrying member and having a developer carrying member that carries developer, the development device attaching toner to the electrostatic latent image formed on the image carrying member to form a toner image;
- a transferring member disposed opposite the image carrying member, the transferring member, with a predetermined transfer voltage applied thereto, transferring the toner image formed on the image carrying member to a transfer destination member;
- a development voltage power supply that applies to the developer carrying member a development voltage having an alternating-current voltage superposed on a direct-current voltage;
- a charging voltage power supply that applies a charging voltage to the charging member;
- a transfer voltage power supply that applies the transfer voltage to the transferring member;
- a control portion that controls the image forming portion, the development voltage power supply, the charging voltage power supply, and the transfer voltage power supply; and
- a memory that stores a resistance value of the transferring member,
- wherein
  - the control portion can perform printing operation and can perform transfer voltage setting operation to determine the transfer voltage for performing the printing operation, and
  - when performing the transfer voltage setting operation, the control portion estimates an amount of static charge of the toner in the development device to determine the transfer voltage based on the estimated amount of static charge of the toner and the resistance value of the transferring member previously stored in the memory.

2. The image forming apparatus according to claim 1 further comprising:
- a printed sheet number counter that counts a number of sheets printed on a cumulative basis,
- wherein
  - the control portion performs, after performing the transfer voltage setting operation, the transfer voltage setting operation again when the cumulative number of sheets printed as counted by the printed sheet number counter reaches a predetermined value.

3. The image forming apparatus according to claim 1 further comprising:

an image density sensor that senses a density of the toner image transferred to the transfer destination member, wherein when performing the transfer voltage setting operation, the control portion forms a plurality of the toner images by applying the development voltages containing the alternating-current voltages with different frequencies respectively and transfers the plurality of the toner images to the transfer destination member by applying a same transfer voltage, the control portion then estimating the amount of static charge of the toner based on change of the density of the toner image sensed by the image density sensor.

4. The image forming apparatus according to claim 1 further comprising:

an image density sensor that senses a density of the toner image transferred to the transfer destination member, wherein when performing the transfer voltage setting operation, the control portion forms a plurality of the toner images by applying the development voltages containing different direct-current components respectively and transfers the plurality of the toner images to the transfer destination member by applying a same transfer voltage, the control portion estimating based on a value of a direct-current component of the development voltage with which a predetermined reference value is obtained as the density of the toner images sensed by the image density sensor.

5. The image forming apparatus according to claim 1 further comprising:

an image density sensor that senses a density of the toner image transferred to the transfer destination member, wherein the control portion can further perform resistance value estimation operation in which the control portion estimates the resistance value of the transferring member to be used in adjusting operation and stores the resistance value in the memory, and when performing the resistance value estimation operation, the control portion transfers a plurality of the toner images to the transfer destination member with different the transfer voltages and estimates the resistance value of the transferring member based on a relationship between the density of the toner image sensed by the image density sensor and the transfer voltage.

6. The image forming apparatus according to claim 1, wherein the transfer destination member and the transferring member are incorporated in a transfer unit that is removably mounted in the image forming portion, and the resistance value of the transferring member is previously stored in the transfer unit such that, when the transfer unit is exchanged, the resistance value is stored in the memory.

* * * * *